(12) United States Patent
Lew

(10) Patent No.: US 9,347,437 B2
(45) Date of Patent: May 24, 2016

(54) COLD STATE ENGINE FOR UTILISING AIR THERMAL ENERGY TO OUTPUT WORK, REFRIGERATION AND WATER

(71) Applicant: Jason Lew, Manukau (NZ)

(72) Inventor: Jason Lew, Manukau (NZ)

( * ) Notice: Subject to any disclaimer, the term of this patent is extended or adjusted under 35 U.S.C. 154(b) by 54 days.

(21) Appl. No.: 14/220,903

(22) Filed: Mar. 20, 2014

(65) Prior Publication Data

US 2014/0202152 A1 Jul. 24, 2014

Related U.S. Application Data

(63) Continuation of application No. PCT/NZ2012/000211, filed on Nov. 15, 2012.

(30) Foreign Application Priority Data

Nov. 16, 2011 (NZ) ........................................ 596481

(51) Int. Cl.
*F03G 7/04* (2006.01)
*F03G 7/05* (2006.01)
(Continued)

(52) U.S. Cl.
CPC ... *F03G 7/05* (2013.01); *F01C 1/22* (2013.01); *F01C 19/02* (2013.01); *F01C 21/08* (2013.01); *F01K 3/00* (2013.01); *F01K 15/02* (2013.01); *F01K 25/06* (2013.01); *F01K 25/10* (2013.01); *F03G 7/04* (2013.01); *F04C 2210/1066* (2013.01); *Y02E 10/34* (2013.01)

(58) Field of Classification Search
CPC ............ F01C 1/22; F01C 19/02; F01C 21/08; F01K 15/02; F01K 25/06; F01K 25/10; F01K 3/00; F03G 7/04; F03G 7/05

USPC ............................................ 60/651, 657, 671
See application file for complete search history.

(56) References Cited

U.S. PATENT DOCUMENTS 3,990,245 A 11/1976 Heilemann
4,494,379 A * 1/1985 McFarland ...................... 60/671
(Continued)

FOREIGN PATENT DOCUMENTS

AU        2002100743 B4    12/2002
WO    WO 2009/008743 A1    1/2009

OTHER PUBLICATIONS

PCT International Search Report mailed Feb. 22, 2013, which was issued in a related PCT International Application No. PCT/NZ2012/000211 (6 pages).

*Primary Examiner* — Jorge Pereiro
*Assistant Examiner* — Dapinder Singh
(74) *Attorney, Agent, or Firm* — Robert P. Michal, Esq.; Carter, DeLuca, Farrell & Schmidt, LLP

(57) ABSTRACT

A cold state engine utilizing air heat energy to output work, refrigeration and water, includes a first cycle and a second cycle. The first cycle comprises of vaporizer, expander, and working fluid pump. The second cycle includes a vaporizer, circulation pump, air heat exchanger. The two cycles are opera lively interconnected via at least a vaporizer, piping, valves, sensors and a generator. Using air or water as a high temperature heat source, an expander generates cryogenic liquid as a low temperature heat source, using natural gases (such as N2, He, Air, CO2 etc.) as a working fluid, based on methods of cryogenic working fluid thermodynamic-refrigeration cycle and frost-free two stage heat exchange cycle.

14 Claims, 12 Drawing Sheets

(51) Int. Cl.
*F01C 1/22* (2006.01)
*F01K 25/10* (2006.01)
*F01C 19/02* (2006.01)
*F01C 21/08* (2006.01)
*F01K 3/00* (2006.01)
*F01K 15/02* (2006.01)
*F01K 25/06* (2006.01)

(56) References Cited

U.S. PATENT DOCUMENTS

| | | | |
|---|---|---|---|
| 4,788,824 A * | 12/1988 | Spurr et al. | 60/671 |
| 6,233,941 B1 * | 5/2001 | Youssef | 60/670 |
| 6,981,377 B2 * | 1/2006 | Vaynberg et al. | 60/641.8 |
| 7,047,744 B1 | 5/2006 | Robertson et al. | |
| 2010/0005801 A1 | 1/2010 | Negre et al. | |

* cited by examiner

B - B (TYPE 2)

Fig. 9 (TYPE 1)

(TYPE 2) Fig. 10

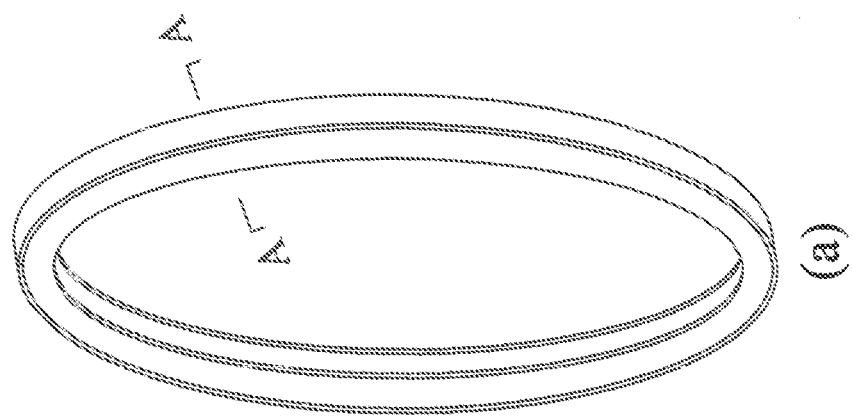
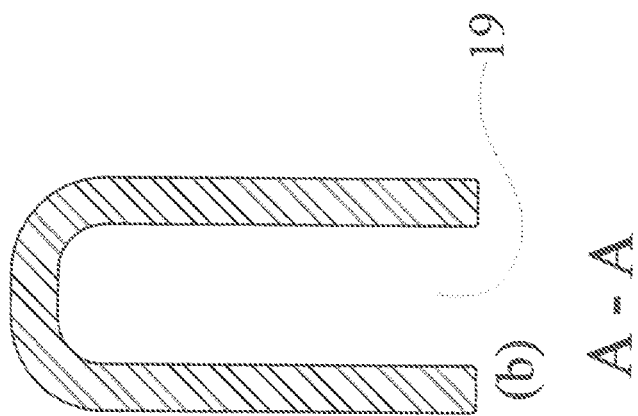
Fig. 11

COLD STATE ENGINE FOR UTILISING AIR THERMAL ENERGY TO OUTPUT WORK, REFRIGERATION AND WATER

CROSS REFERENCE TO RELATED APPLICATIONS

This application is a U.S. National Phase Application under 35 USC 371 of International Application No. PCT/NZ2012/000211 filed Nov. 15, 2012, which claims priority from New Zealand Application No. NZ 596481, filed Nov. 16, 2011, the entire disclosure of each of which is incorporated herein by reference.

FIELD OF THE INVENTION

The invention relates to the field of new energy sources, it is a type of cold state engine or apparatus that can conveniently and efficiently use air thermal energy to output work, refrigeration, and water, especially comprising "Cryogenic Working Fluid Thermodynamic—Refrigeration Cycle", "Frost-Free Two Stage Heat Exchange Cycle" and other fundamental methods, as welt as "High Pressure Expander" and other key device.

BACKGROUND OF THE INVENTION

The atmosphere is a low temperature heat reservoir, with considerable atmospheric thermal energy. Atmospheric thermal energy mainly comes from, solar energy, followed by geothermal energy and the dissipation of waste heat into the atmosphere from various human energy consumption activities (such as use of coal, oil, gas, electricity etc). Therefore the atmosphere can said to be an almost inexhaustible "sea of energy".

However, present thermodynamics theory, methods and devices cannot take advantage of the environmental heat energy from this considerable and ever present energy reservoir to do work or to output electrical energy. Previously, there were many methods and apparatus that attempted to make use of environmental heat energy to do work and output power. However, none was successful. So far, methods and apparatus similar to this invention have not been reported. In this specification, unless the contrary is expressly stated, where a document act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT OF THE INVENTION

It is an object of the prevent invention to provide an apparatus and method that overcomes or substantially ameliorates some of the disadvantages and limitations of the known art or at least provides the public with a useful choice. It is an alternative object of the prevent invention to provide an apparatus and method that can be applied to any of a variety of functional needs.

SUMMARY OF THE INVENTION

Accordingly, in a first aspect, the invention consists in a cold state engine or apparatus comprising a first, cycle and a second cycle, the first cycle comprising: a vaporiser; an expander and a pump arranged to pump a cryogenic working fluid (the first fluid) in a circuit through the expander and the vaporiser, so that, the first fluid can adiabatically expand within the expander to output work and cryogenic liquid; and the second cycle comprising: the vaporiser, an ambient heat exchanger, and a circulation pump arranged to pump a heat-transfer liquid (the second liquid) in a circuit through the vaporiser and the ambient heat exchanger; wherein the vaporiser is arranged to act as a heat exchanger to transfer heat from the second liquid to the first fluid, and the ambient heat exchanger is arranged to act as a heat exchange unit to transfer heat to the second liquid from an external energy source (such as water or the surrounding air).

In a second aspect, the invention consists in a method of using a cold state engine or an apparatus to convert ambient air or water heat energy to output mechanical work, refrigeration and/or water in a two cycle, the method comprising a first cycle and a second cycle; wherein, in the first cycle, the first fluid is heated in a vaporiser to a high pressure vapour state, and is then transferred, to an expander where it is permitted to adiabatically expand, and used to output work and/or cryogenic liquid thereby, causing a decrease in the temperature of the vapour until it is liquefied, the resultant cryogenic liquid then being pumped back to the vaporiser; and wherein, in the second cycle, the second, liquid is pumped from the vaporiser to an ambient heat exchanger where it receives heat from the ambient air, causing the temperature of the air to decrease and output refrigeration capacity, giving it a refrigeration function. When air temperature fails to dew point, the moisture in the air condenses, which can then be collected, as fresh, water, thus giving it a function to produce fresh water. At the same time, this produces dry air, giving it a function to dehumidify. The temperature of the second liquid rises after it absorbs air heat and change into warm liquid, which, is then circulated to the vaporiser to transfer heat to the first fluid, thereby causing the temperature of the second liquid to decrease and change into cold liquid.

The invention provides the following methods and apparatus;

1. Using air or water as high temperature heat, source, and the cryogenic liquid generated by the expander as low temperature heat source
2. Use of nature gases (such as nitrogen, helium, air, CO2 etc) to act as the working fluid and use of water or low freeze point antifreeze as heat transfer liquid;
3. Cryogenic working fluid thermodynamic-refrigeration cycle method;
4. Working fluid's gas/liquid phase change cycle method;
5. Frost-free two stage heat exchange cycle method;
6. Power generation method for creating electricity, particularly by mobile devices;
7. Thermal energy recycling method;
8. Refrigeration capacity use in separate stages;
9. Making water from the air;
10. Dehumidifying method;
11. Water thermal energy utilisation method;
12. High pressure expander;
13. Finned tube and shell vaporiser.

BRIEF DESCRIPTION

The invention will, now be described, by way of example only, with reference to the accompanying, drawings:

FIG. 1 shows a schematic diagram of a preferred embodiment of the "Cold State Engine" or "Apparatus" or "Frost—Free Two Stage Cycle Thermodynamic—Refrigeration System" of the present invention.

FIG. 2 is a block diagram showing the first cycle and the second cycle combined together by a vaporiser to form the cold state engine or apparatus of FIG. 1.

FIG. 3 shows a graphical representation (Pressure vs. Specific Enthalpy) of a cryogenic working fluid thermodynamic-Refrigeration Cycle based on Nitrogen as working fluid.

FIG. 4 is a perspective view of a high pressure expander for use in the first cycle of FIG. 1.

FIG. 5 shows a perspective view of the piston wheel used in the expander of FIG. 1.

FIG. 6 is an axial cross-sectional view of the expander of FIGS. 4 and 5 along A-A axis.

FIG. 7 is an axial cross-sectional view of the expander (type 1) of FIGS. 4 and 5 along B-B axis.

FIG. 8 is an axial cross-sectional, view of the expander (type 2) of FIGS. 4 and 5 along B-B axis.

FIG. 9($a$) is a perspective view of a band shaped sealing ring (type 1).

FIG. 9($b$) is an axial cross-sectional view of a band shaped sealing ring (type 1) along B-B axis.

FIG. 9($c$) is an axial cross-sectional view of a hand shaped sealing ring (type 1) along A-A axis.

FIG. 10($a$) is a perspective view of a band shaped sealing ring (type 2).

FIG. 10($b$) is an axial cross-sectional view of a band shaped sealing ring (type 2) along B-B axis.

FIG. 10($c$) is an axial cross-sectional view of a band shaped sealing ring (type 2) along A-A axis.

FIG. 11($a$) is a perspective view of a gasket ring.

FIG. 11($b$) is an axial cross-sectional view of the gasket ring FIG. 11($a$) along A-A axis.

FIG. 12($a$) is a perspective view of a vaporiser for use in the cold state engine or apparatus of FIG. 1.

FIG. 12($b$) is an axial cross-sectional view of the vaporiser of FIG. 12($a$) along A-A axis.

FIG. 12($c$) is an axial cross-Sectional view of the vaporiser of FIG. 12($a$) along B-B axis.

DESCRIPTION OF THE DRAWINGS

Referring first to FIGS. 1 and 2, the present invention comprises a "Cryogenic Working Fluid Thermodynamic—Refrigeration Cycle" hereinafter "a first cycle" and "Frost-Free Two Stage Heat Exchange Cycle" hereinafter "a second cycle". The first cycle and the second cycle are coupled together to form a "Frost-Free Two Stage Cycle Thermodynamic—Refrigeration System", hereinafter called a "Cold State Engine" or "Apparatus".

As can be seen in FIGS. 1 & 2, the first cycle includes three main sections, namely a vaporiser (1), a high pressure expander (4) and at least one high pressure working fluid pump (6). These three sections are operatively connected by piping (2) as shown in FIG. 1. Also, as can be seen in FIG. 1, there are other-accessories such as at least one valve (3), storage tank (7), thermometer (11), pressure meter (32), safety valve (13), release valve (14), one way valves (15), and generator (5) that are provided. The surfaces of the expander (4), the working fluid pump (6) and the piping in between are coated by an insulation layer (16).

Figure 1:
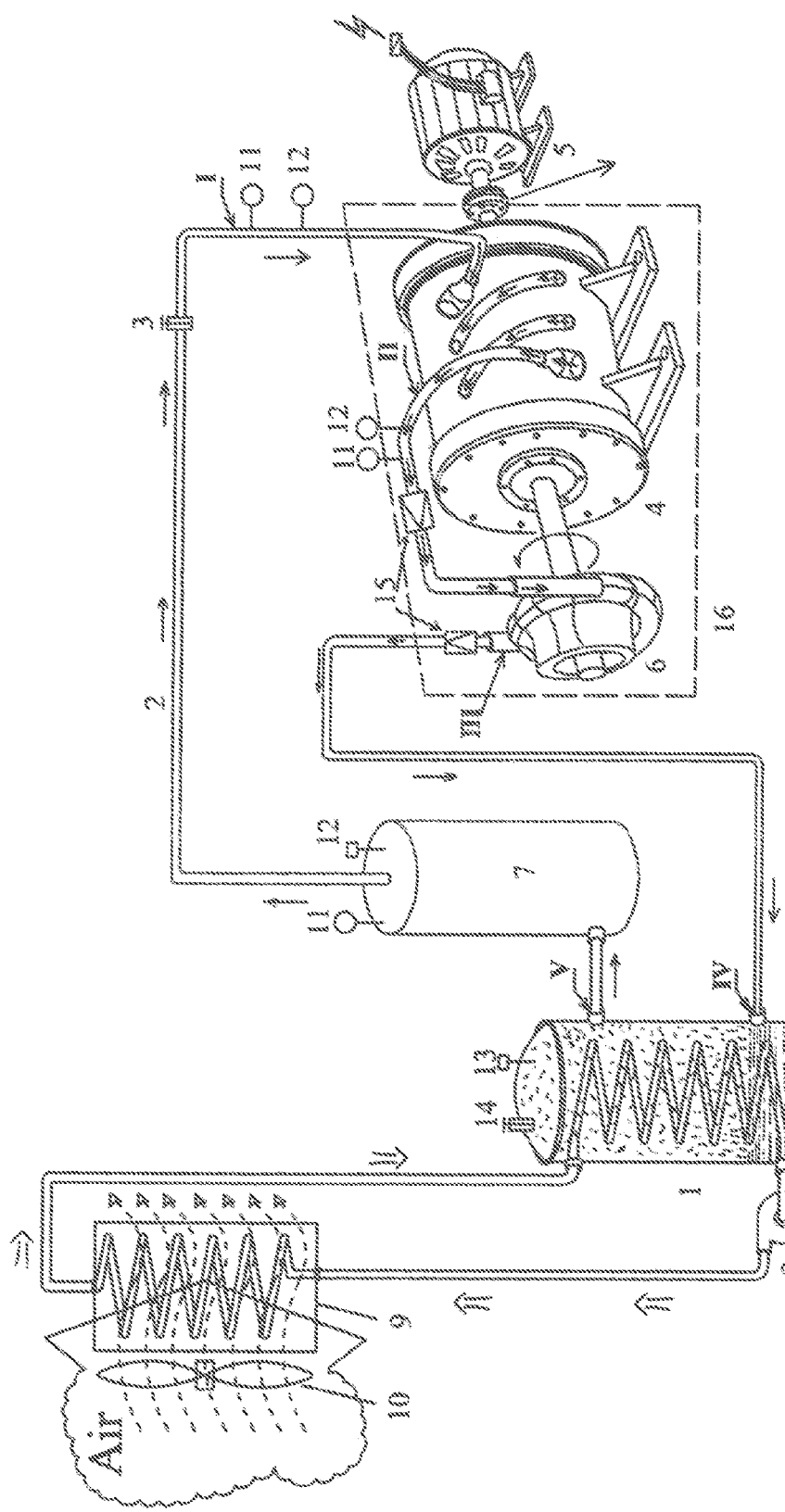

The second cycle mainly includes a circulation pump (8), an ambient heat exchanger (9) and the vaporiser (1) that are connected operatively together by piping (2) as shown in FIG. 1. The primary purpose of this second cycle is to overcome the challenge of frost forming on the ambient heat exchanger. The secondary purpose of the second cycle includes refrigeration, dehumidification and water-making capability.

The two cycles, namely the first cycle and the second cycle are coupled together through the vaporiser (1) to form the Cold State Engine or the Apparatus. The vaporiser (1) contains the cryogenic working fluids or the first fluid such as liquid nitrogen, liquid air or liquid carbon dioxide ($CO_2$) etc. Liquid state the first fluid or high pressure gas is manually filled into the first cycle from port (14) of the vaporiser (1) to act as a working fluid and starting power. At the same time, a heat-transfer liquid or the second liquid is also manually filled into the second cycle.

The first cycle process is comprised of the following three connected thermodynamic processes (see FIG. 2):

IV-V; Isobaric Absorbing Heat (vaporise) Process:

This converts ambient thermal energy into high pressure vapour, within the vaporiser. The first fluid in the vaporiser carries out heat exchange with the second cycle's the second, liquid, which absorbs the heat energy in the second liquid. (This is the first cycle's heal input. It spontaneously occurs due to the difference temperature. The heat transfer therefore does not consume work.) Then the first fluid vaporises into vapour and its temperature rises to near ambient temperature (e.g. $T_1=300$ k) and its pressure rises to the set maximum working pressure (e.g. $P_1=12$ Mpa). This high pressure vapour also fills the storage tank and die piping op to the valve (3).

I-II; Adiabatic Expansion (do work) Process:

This converts high, pressure vapour in the expander info mechanical work and/or cryogenic liquid. The high pressure vapour inside the vaporiser and the storage tank (primary state parameters; $T_1=300$ k, $P_1=12$ Mpa) flows into the high pressure expander through, piping to propel a piston wheel to turn, which outputs mechanical work and cryogenic liquid. An adiabatic enthalpy drop occurs here, its temperature drop is directly proportional to its pressure drop. When, the temperature falls to the vapour's liquefaction range (e.g. N2, $P_2=0.1$ Mpa, T2=63K to 76K), a gas/liquid phase change occurs. Because the liquid state working fluid exiting the expander has a cryogenic liquid, the expander also outputs excellent refrigeration capacity whilst outputting its mechanical work.

II-III; Isentropic Compression (pressure increase) Process:

This process occurs within the high, pressure working fluid pump and consumes work. It raises the pressure of the first fluid and pumps it into the vaporiser. The first fluid enters the high pressure working fluid, pump through piping. The first fluid is then pumped into the vaporiser and again carries the isobaric absorbing heat process and vaporise into high pressure vapour. The high pressure working fluid pump consumes energy to work. However, the liquid state working fluid is nearly incompressible, and the pressure rises easily. The working fluid pump consumes energy, but is calculated to be only 5% of the work output by the expander. The whole process repeats, thereby forming "a cryogenic working fluid thermodynamic-refrigeration cycle" (the "a first cycle" of this invention).

Figure 2:
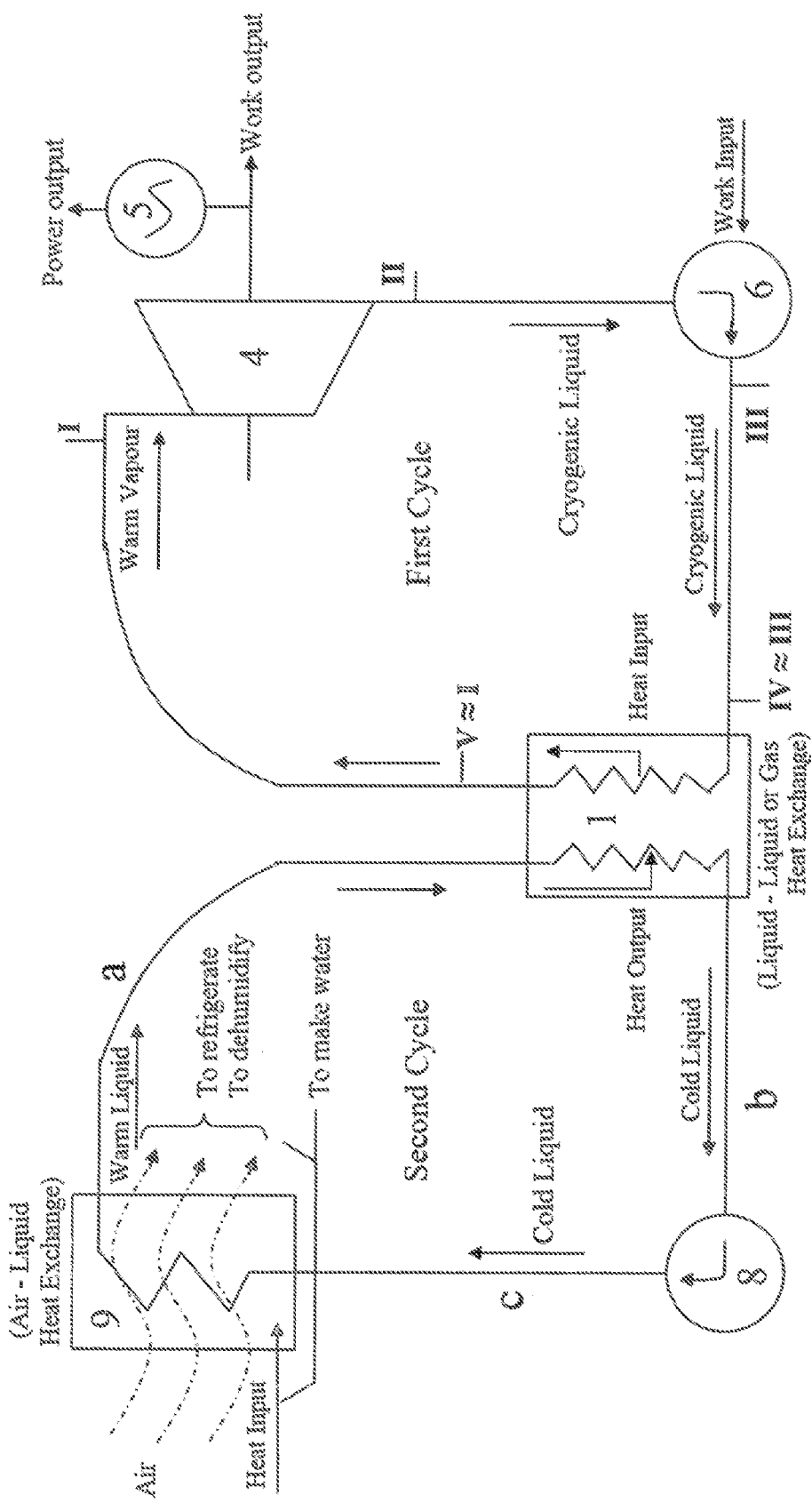

As seen in the left tend side of FIGS. 1 & 2, the second cycle is a frost-free two stage heat exchange cycle. In this second cycle, a heat-transfer liquid (the second liquid), preferably water or, even better, a antifreeze having a lower freezing point (e.g. $-50°$ C.), is circulated by the circulation pump. The second liquid gives upbeat to the first fluid. The second liquid's temperature drops to the determined temperature (e.g., $-20°$ C.). The cold second liquid flows to the air heat exchanger and exchanges heat with external heat source (e.g. air or water). After this exchange, the air temperature drops to about $-20°$ C. Now the cold air released by the air heat exchanger output provides excellent refrigeration capacity and can be used for various refrigeration fields. When the air temperature falls to dew point, condensation occurs and the condensate can be collected and purified as fresh water. When the second liquid absorbs ambient air heat, its temperature rises to the ambient temperature (e.g. 25° C.). It will flow to the vaporiser to carry out heat exchange again, and the heat energy transfers to the first fluid in first cycle (as heat input of the first cycle). The second liquid then becomes cold liquid once more. This process repeats, to comprise the second cycle.

As explained above, the two cycles, namely the first cycle and the second cycle, are coupled together through the vaporiser (1) to form the "Frost-Free Two Stage Cycle Thermodynamic—Refrigeration System" or "Cold State Engine" or "Apparatus". Liquid state cryogenic working fluid (the first fluid) or high pressure gas is manually filled into the first cycle (1) from port (14) of the vaporiser (1) to act as working fluid and starting power. At the same time, heat-transfer fluid (the second liquid) is also manually filled into the second cycle. For operational safety, the amount of the first fluid used should be determined by the total vaporising volume comprising of vaporiser (1), storage tank (7) and piping (2) up to the valve (3); and vaporising temperature (the temperature of the heat source), so that when the first fluid is completely vaporised and expanded, it can only reach the first cycle system's maximum working pressure. Even when the high pressure gas is filled into the first cycle system through the vaporiser (1), it can still only reach the first cycle system's maximum working pressure. Provided that there is no leak in the first cycle system, the initial first fluid (filled cryogenic working fluid or high pressure gas) will always remain in the first cycle system (similar to the way refrigerant remains in a refrigeration machine for a long time) which can be used, to open, valves (3) and start operation, and to close the valve (3) and turn off the apparatus. The degree of opening of the valve (3) directly controls the flow of the first fluid, thereby directly controlling the rotational speed and shaft torque of the expander (4). As such, it is a continuous variable transmission, and there is no need for a gearbox.

In the second cycle, the second liquid is water or, preferably, a antifreeze having a lower freezing point (e.g.; −50° C.). The working temperature of the ambient heat exchanger (9) is adjusted by using a controlling device (not shown) to adjust the speed of the circulation pump (8), which in turn controls the flow of the second liquid in circulation.

To enhance the efficiency of the heat exchange process, the circulation pump (8) and fan (10) of the second cycle also consume energy, so that the work consumed is less. According to the theoretical calculations, it is around 1% of the work output by the expander. Therefore, there is still a large net work output from the expander (4) after energy consumption by the working fluid pump (6), circulation pump (8), fan (10), and electrical controls, etc.

In the present invention, the mechanical work output from the expander (4) is high quality energy, which can be directly used to power vehicles, ships, aircrafts and other powered machineries, and it can be converted into electrical energy, thermal energy or other forms of energy for use. Because of a dissipation effect, the different types of energy such as mechanical energy, electrical energy, thermal energy etc., will all be dissipated into the atmosphere as "waste heat" after being used. The atmospheric thermal energy will be reclaimed and used by the present invention, therefore realising a "Thermal Energy Recycling Method" which maintains a balance thermal energy by having no increase or decrease in thermal energy. This pioneers a new era of free and easily attainable, green and inexhaustible energy.

After adiabatic expansion the liquid state working fluid created by the expander (4) will be cryogenic, so that corresponding heat exchange technology and devices can then be applied to obtain "Refrigeration Capacity's Use in Separate Stages" (For example: air conditioning 20° C. to 25° C., storage 8° C., refrigerating 4° C., freezing −4° C. to −80° C. cryogenic uses −120° C. to −160° C., liquefying air −186° C. to −210° C. etc.).

Since naturally occurring gases (such as nitrogen and air) are selected as the working fluid, any leaks that occur during usage will not cause any pollution. Therefore the harmful effects that current refrigerants pose to the environment are eliminated. This in effect pioneers a new era of green and free refrigeration technology.

All air contains water vapour but with different levels of moisture. When air exchanges heat through the heat, exchanger and its temperature fells to the dew point, the water vapour in the air will condense. After collection and purification, it will be high quality fresh water. This pioneers a method of using air to make fresh water and can solve fresh water shortage problems. It also gives a reliable technology facilitating the creation of habitats in deserts and other water-scarce locales. Once the water vapour in the air condenses and is removed, the air will have become dry air. Therefore the invention also has a dehumidifying capability.

All air contains moisture. When air directly exchanges heat with cryogenic working fluid, it is easy for frost to form on the surface of the heat exchanger (9). Frost will obstruct beat conductibility and causes heat exchanging efficiency to fell. As more and more frost forms, the heat exchanger will eventually completely cease to function. The "Frost-Free Two Stage Heat Exchange Cycle" is designed to solve this problem. Water has a large specific heat and flows easily. Cryogenic working fluid, is used to exchange heat with water, then water is used to exchange heat with air, thus constituting the "cryogenic working fluid-water-air" two stage heat exchange method. Water temperature is directly proportional to the amount of heat exchanged but is inversely proportional to the flow volume. The amount of heat exchanged is directly proportional to the size of work, output. When determining the size of work output, the amount of heat exchanged cannot be adjusted, but the flow of the water circulation can be. The flow can be adjusted to reach the required water temperature to ensure that, the circulating water does not freeze and also that no frost forms on the surface of the heat exchanger. In order to minimise the power used by the circulation pump (8), to output excellent refrigeration, capacity, and that the invention can be effectively operated in colder regions, it would be better to use a low freeze point (such as −50° C.) antifreeze as heat transfer liquid.

Example 1

Using Nitrogen as a Working Fluid

Figure 3:
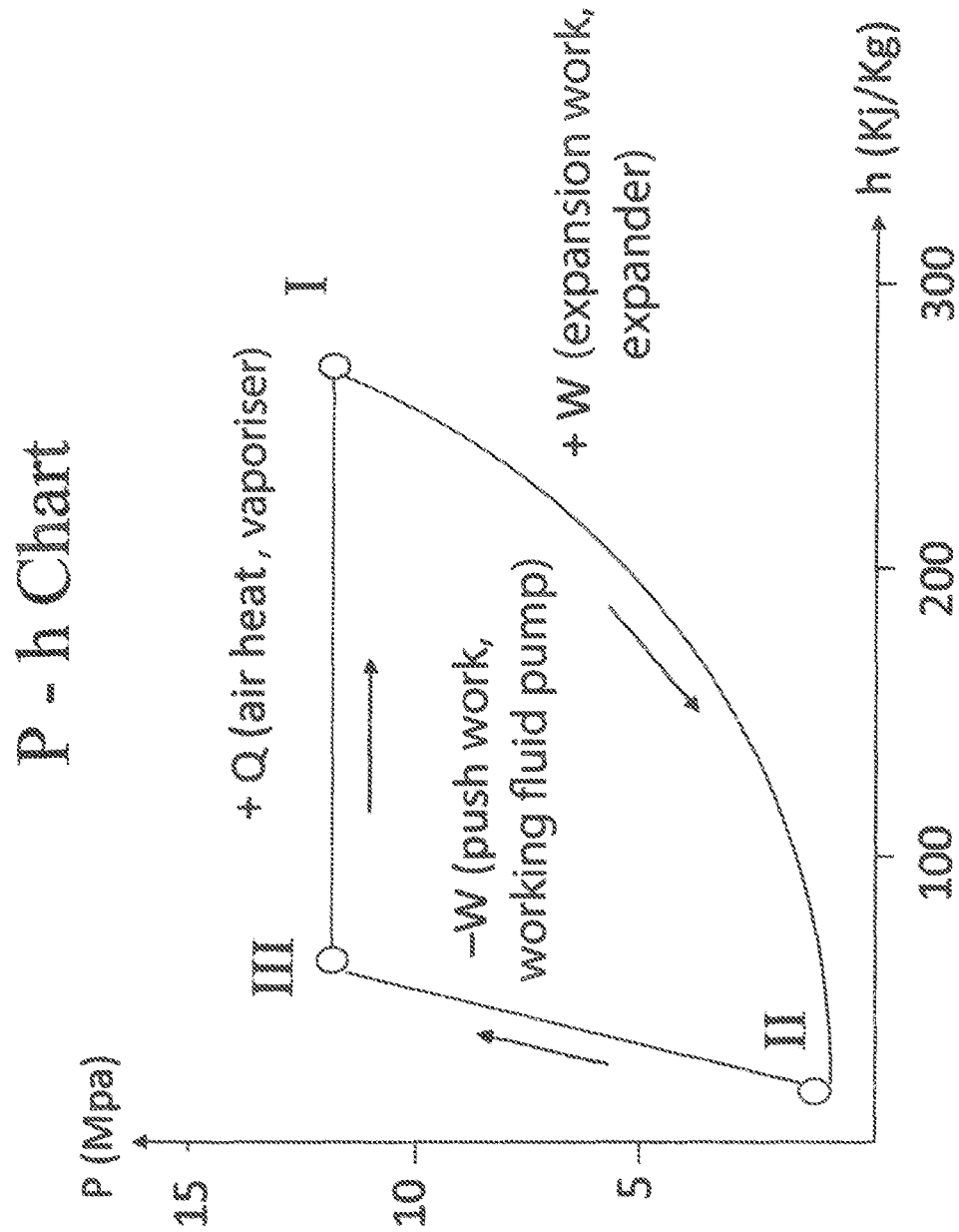

Nitrogen can be used as a working fluid (see FIGS. 1,2 & 3). According to nitrogen's thermodynamic table of properties:

For a liquefaction, temperature range: 63.151K to 77.335K,

At Critical point: T=126.19 K, P=3.3978 MPa

At Point I: T1=300K, P1=12 Mpa, h1=291.94 Kj/Kg, $\rho 1$=122.88 kg/m$^3$

At Point II: T2=76K, P2=0.1 Mpa, h2=−124.86 Kj/Kg, $\rho 2$=812.88 kg/m$^3$

At Point III: T3=82K, P3=12 Mpa, h3=−105.82 kj/kg, ρ3=810.9 kg/m³

At Point IV: Thermal performance is approximately equal to that in point III

At Point V: Thermal performance is approximately equal to that in point I

Wherein, T=Temperature, P=Pressure, h=Specific Enthalpy and ρ=Density

FIG. 3 is the graphical representation of the above data.

The heat-transfer liquid (the second liquid) is manually filled into the second cycle System. At the same time after the calculated amount of liquid nitrogen has been filled into the first cycle system from the vaporiser (1) at port (14). Liquid nitrogen absorbs heat in the vaporiser (1) approximately at ambient temperature, T1=300K, and then vaporises and expands into a high pressure vapour at P1=12 Mpa. This high pressure vapour also fills the storage tank (7) and piping (2) up to valve (3). The high pressure vapour then flows along piping (2) and through the valve (3) into the high, pressure expander (4), where it undergoes adiabatic expansion and propels the piston wheel to turn, which outputs shaft work. After that, the pressure of the high pressure vapour falls to 0.1 Mp (P2) and the temperature of the vapour proportionally falls to 76K (T2), which is within the liquefying temperature range of nitrogen (63.151K to 77.335K). The nitrogen vapour liquefies to form cryogenic liquid nitrogen.

For example: nitrogen gas can be seen as an ideal gas, calculated according to the ideal gas adiabatic expansion state equation; When $T_1$=300K, $P_1$=12 Mpa, $P_2$=0.1 Mpa, κ (specific heat ratio)=1.4, final state temperature $T_2$ can be calculated as below:

$$\frac{T_2}{T_1} = \left(\frac{P_2}{P_1}\right)^{\kappa-1/\kappa}$$

$$T_2 = T_1 \times \left(\frac{P_2}{P_1}\right)^{\kappa-1/\kappa}$$

$$= 300 \times (0.1/12)^{14-1/14}$$

$$= 300 \times (0.0083)^{0.286}$$

$$= 76K$$

The cryogenic liquid nitrogen's pressure is then raised and pumped by high pressure working fluid pump (6) back into the vaporiser (1) at a pressure of 12 Mpa, where it undergoes an isobaric absorbing heat process and vaporise into a high pressure nitrogen vapour at 6.26 times the initial liquid nitrogen volume, and the pressure at 12 Mpa. This process repeats to form the "cryogenic working fluid thermodynamic-refrigeration, cycle" or "the first cycle". In this first cycle, the high pressure expander (4) outputs mechanical work and cryogenic liquid. The high pressure working fluid pump (6) consumes work but, because liquid state working fluid is nearly incompressible, the work consumed, according to theoretical calculations, is 5% of the work output by the expander (4). To enhance heat exchange, the energy consumed by the circulation pump (8) and fan (10) used in the second cycle is, according to theoretical calculations, around 1% of the work output by the expander (4).

For example, to design an apparatus with an ensured work output rate of 20 kW, work theoretical calculations is as follows:

| Working fluid (N2, T1 = 300 K, P1 = 12 Mpa, h = 291.94 Kj/Kg) | |
|---|---|
| Mass flow rate: | 0.1 Kg/S |
| Expander work output | 29.19 kW/S |
| Working fluid pump energy consumption (PV = 12 Mpa × 0.000123 M³) | 1.476 kW/S |
| Circulation pump energy consumption (Using heat-transfer liquid with a lower freezing point of −50° C., pressure rises 0.05 Mpa, temperature difference ±50° C., specific heat 4.18 Kj/Kg/K, heat transfer rate 29.19 Kj/S, flow 0.1396 Kg/S) | 0.0698 kW/S |
| Fan energy consumption (air specific heat 1.05 Kj/Kg/K, temperature difference ±20° C., heat transfer rate 29.19 Kj/S, air flow 1.077 M³/S, pressure rises 0.02 Mpa) | 0.215 kW/S |
| Net work output = expander work output − working fluid pump energy consumption − circulation pump energy consumption − fan energy consumption = 29.19 − 1.476 − 0.0698 − 0.215 = 27.43 kW/S | 27.43 kW/S |
| Net work rate = net work/expander work output = 27.43/29.19 | 94% |

Considering the fact that equipment efficiency hardly ever reaches 100%, the electrical controls also consume some electrical power (about 1%). In addition to factors Chat are outside our control, 13 percentage points will be consumed. Therefore the entire cold state engine or apparatus still has around 80% net power output and the first cycle can function as a self sustaining process. The P-h diagram of FIG. 3 shows that the first cycle is a continuous self-sustaining process. The enthalpy of the high pressure vapour from air heat energy is converted into mechanical work by the expander (4).

In most areas that are inhabited by humans, the ambient temperature usually ranges between +30° C. to +35° C. Even in colder regions (for examples where the temperature is −50° C.), there is still a large temperature difference between liquid nitrogen (at −196° C.) and air, therefore the liquid nitrogen can still absorb air heat energy, vaporise and expand into high pressure vapour and do work. If used in summer and in tropical and temperate regions, not only will energy be generated but at the same time the refrigeration and air conditioning functions are also easily obtained, thereby providing green and free refrigeration and air conditioning.

Working Fluid's Gas/Liquid Phase Change Cycle:

The extreme pressure of liquid nitrogen (at temperature range between −196° C. to −210° C.) absorbing heat, vaporising and expanding under room temperature (of 25° C.) is very high and can reach 75 MPa. This provides the basis for applying "Working Fluid's Gas/Liquid Phase Change Cycle".

According to ideal gas adiabatic expansion equation of state: T2/T1=(P2/P1)κ−1/κ, after high pressure nitrogen vapour has expanded adiabatically, the temperature drop is directly proportional to the pressure drop. Therefore, the criteria for setting the cold state engine or apparatus's first cycle's primary pressure (P1) should be such that the final temperature (T2) of working fluid after it has expanded adiabatically should fall within its liquefaction temperature range. If not the, primary pressure (P1) will be too high, the final temperature (T2) drop will be too low and 12 will surpass the liquefaction temperature range (for example, N2, 63.151K to 77.355K) and enter the solidifying temperature range (<63.151 K), in which case liquid nitrogen will solidify and block the piping (2), thereby disrupting the first cycle.

In the same way, if P1 is too low, T2 will not fail to the liquefaction temperature range and the working fluid will not be able to liquefy and will remain in a gaseous state. Because the working fluid pump (6) can only pump a liquid and cannot pump a gas, the first cycle will also be disrupted. In such a case, one may replace the working fluid pump (6) with a compressor and the first cycle could theoretically continue. However, the first cycle efficiency and net work output will be greatly reduced, Selection of Working Fluid or Substance:

The invention is able to use natural gas (for example Nitrogen, Helium, Air, CO2 etc) as working fluid. This is because, firstly, they have excellent cryogenic properties in melt liquid state well below ambient temperature and hence can absorb a lot of ambient heat energy in order to vaporise into high pressure vapour. The high pressure vapour can produce work and, after expanding adiabatically and doing work, its temperature will fell and it will revert to the liquid state, thus producing a spontaneous thermodynamic—refrigeration cycle. Secondly, the heat absorption properties and specific heat of such a substance are excellent and energy density is large (can reach 300 Kj/Kg). Thirdly, such substances are natural, harmless and are easily obtained.

Uses

The invention as described above can be used in many different ways according to different, requirements. Some of the uses are described below:

Using refrigeration capacity: In the second cycle, the heat exchange system can use antifreeze (having a lower freezing point of −50° C.) as a heat-transfer liquid, and the temperature of cold air that leaves the heat exchanger (9) able to be adjusted for the following functions: for cooling electronic equipment such as a CPU, for air conditioning (at approximately 20° C. to 25° C.), for cool storage (at approximately 8° C. to 14° C.), for refrigeration (at approximately 4° C.), for freezing (at approximately −8° C. to −25° C.) etc.

Similarly, the first cycle uses the dry air used for heat exchange in the vaporiser (the vaporiser needs to be especially designed for this working condition). The resultant cold air after the temperature adjustment can be used for freezing (at approximately −30° C. to −80° C.), materials treatment, cooling of machining, freeze grinding (at approximately −120° C. to −160° C.), etc. It can also be used to directly liquefy air (at approximately −196° C. to −120° C.) to make air products.

Utilisation of Power: The mechanical work output by the high pressure expander (4) is high quality energy and can be used as the power source for all mechanically powered machinery or machineries such, as but not limited to vehicles, ships and aircraft. Alternatively, the mechanical work output, by the high pressure expander (4) can be further converted into electricity, thermal energy and other types of energy for other uses. For example, the invention can provide a 20 KW model per household or business which can be used to provide power, refrigeration, air condition and fresh water making needs. The size of the components and the overall cold state engine or apparatus can be designed according to use. The cold state engine or apparatus of the invention can be designed as a micro-generator device for powering electronic devices (for example computers, cell phone etc), robots, outdoor equipment etc.

Thermal energy recycling: After the air heat energy has been converted into work output by the expander, it can further be converted into electricity, heat or other types of energy for use. Because of the dissipation effect, it will be turned into waste heat in the atmosphere. The atmospheric thermal energy can be utilised again by the invention, therefore creating the "Thermal Energy Recycling Method", in this way, the cold state engine or apparatus will neither increase in total amount to exacerbate global warming, nor does it deplete, which completely solves energy source shortages and pollution problems.

However, in the case of industries (such as cement or steel manufacturing industries) with large scale and concentrated power use, when the thermal energy in the air surrounding these types of factories has been used, there will be large quantities of cold air leaving the heat exchanger, and large quantities of waste heat gases after energy has been harnessed. Because the specific weight of heat, gases is less than that of cold air, the waste heat gases will rise in the atmosphere while the cold air remains at the bottom. Under conditions of stagnant air flow, there will be a large quantity of cold air concentrated in the area surrounding the factories, leading to low temperatures and undesirable microclimate conditions. Therefore, heavy energy users may design shelter enclosed plant buildings and use closed thermal energy recycling methods, where the cold state engine or apparatus of the present invention and various other powered devices are installed in the shelter. The cold state engine or apparatus absorbs heat and generates energy to be converted into electricity, heat or other types of energy, after which the waste heat and cold gases are released inside the shelter. This creates a beneficial closed heat energy recycling method.

Air water production: The invention can be used to make fresh water from the air. In such cases, the air heat exchanger (9) should be specifically designed with the requirements of good air flow, highly efficient heat exchange and convenient collection of condensate. The reaching of the dew point temperature and maximum condensation of the air moisture can be obtained by adjusting the working temperature of the heat exchanger according to the air humidity. High quality fresh water can be obtained by purifying and/or mineralising the condensate collected. For example, a domestic model of the invention (20 KW model), working at a room temperature of 25° C., relative Humidity of 70% (Humidity of air: 14 g/Kg), heat exchange temperature difference at +/−20° C., can produce fresh water at the rate of 48 Kg per hour. After the fresh water has been used for drinking, cooking, cleaning, irrigating, etc., the waste water will be released into the environment again because of evaporation, and will rejoin the natural water cycle. The air moisture will be harnessed again by the present invention, thereby providing a method of directly producing fresh water from the air, which completely solves fresh water spoilage problems.

Dehumidifying Use: When the air goes through the heat exchanger (9), the water vapour condenses and the air will be dehumidified. The apparatus of the present invention can be used to cycle the air to reach the required humidity, thus obtaining the dehumidifying function.

Utilisation of thermal energy in bodies of water: Bodies of water such as rivers, lakes, oceans, underground water, etc., contain a large amount of thermal energy. However, since this water cannot be as conveniently used as air, the invention focuses on the atmosphere as the main heat source. In order to utilise the thermal energy of water, the second cycle which is a closed system can be changed into an open system. That is to say, the entry port of the circulation pump (8) can be connected directly to the water source and that water can be circulated to the vaporiser (1) for heat exchange. Such designs can be suitable for ship or other maritime use.

Design of an Expander

The expander (4) used in the above first cycle will now be described in detail.

The piston wheel expander shown in FIGS. 4 to 11 is one embodiment of the aforementioned high pressure expander (4).

Figure 4:
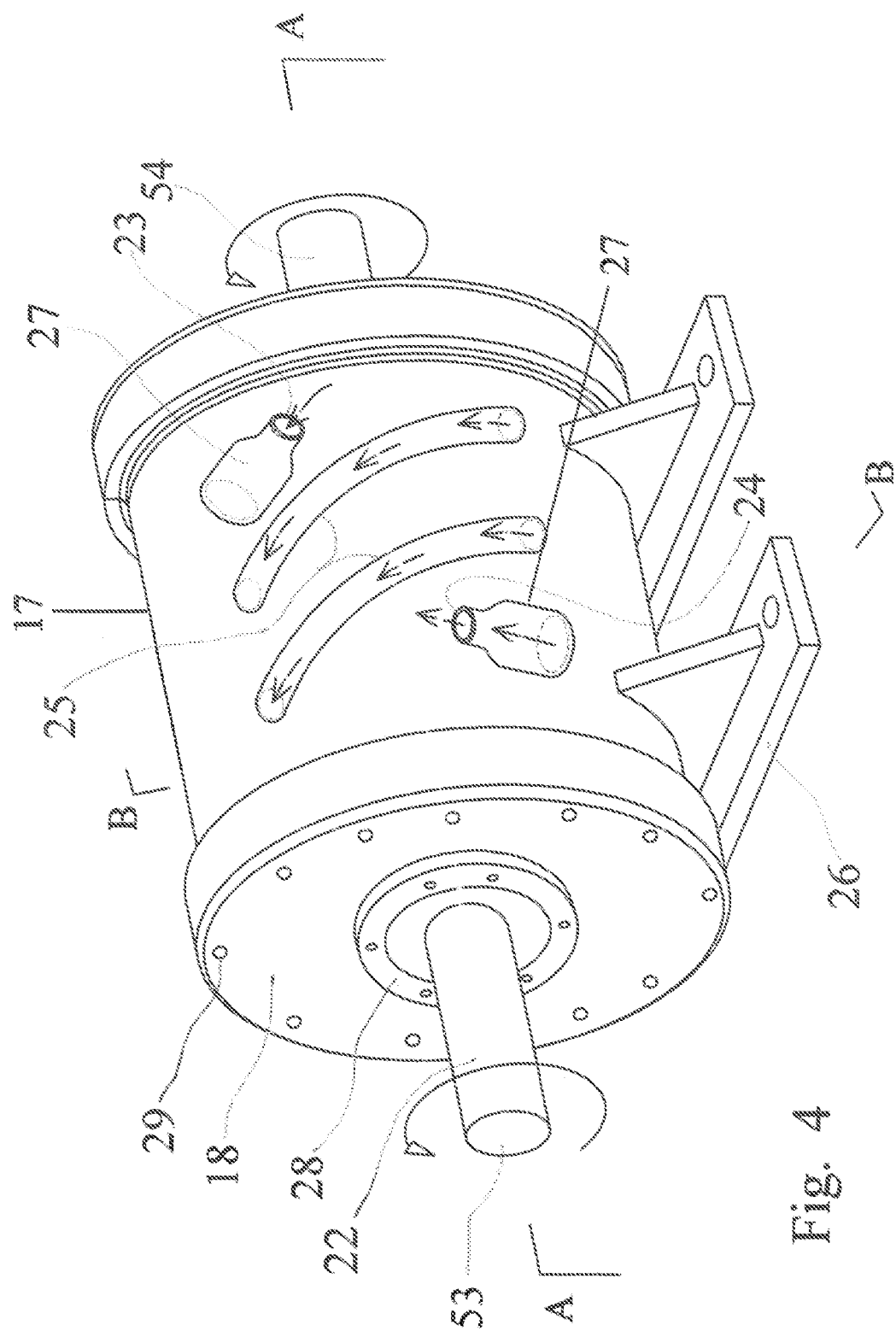
Figure 5:
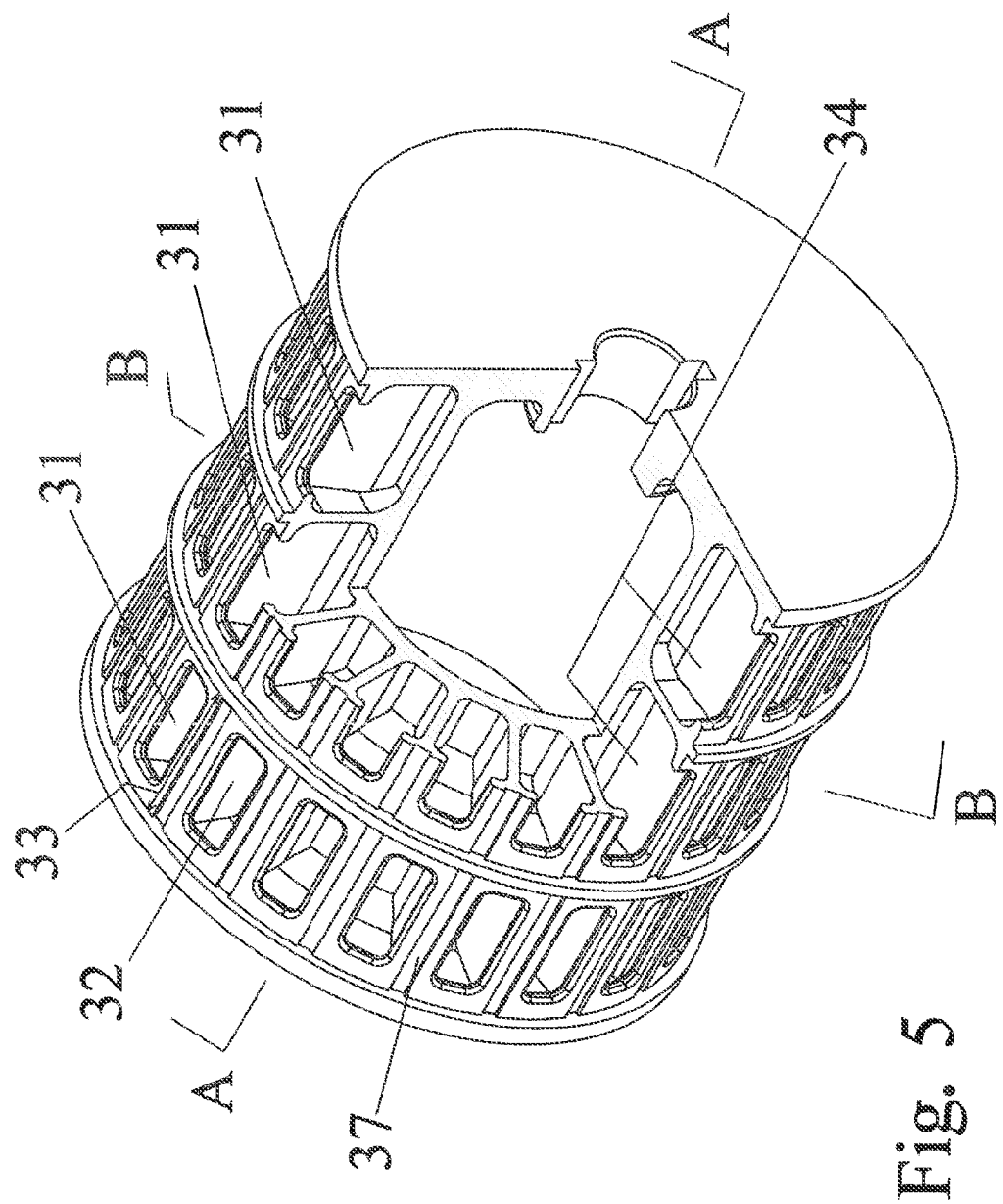
Figure 6:
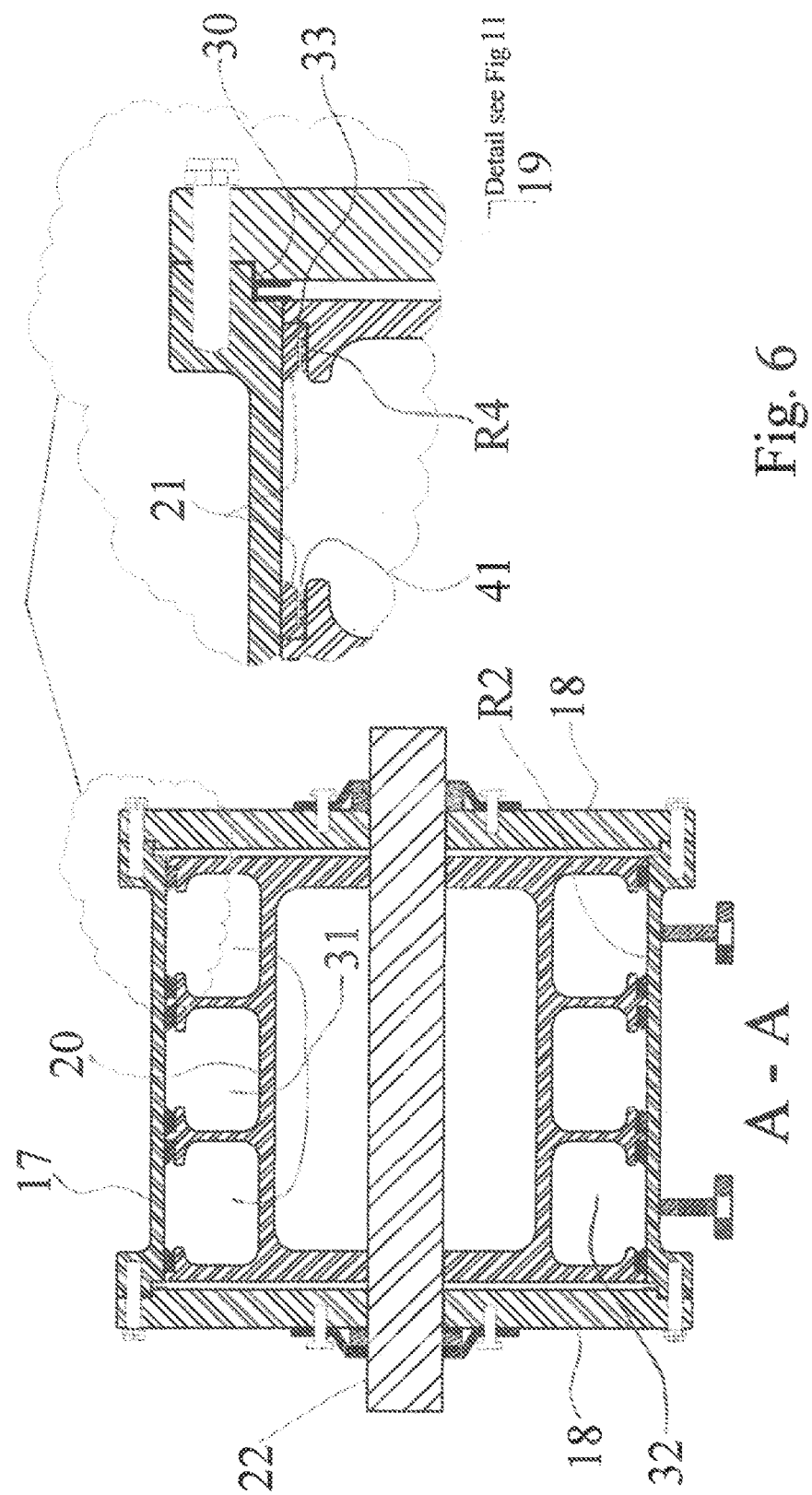
Figure 7:
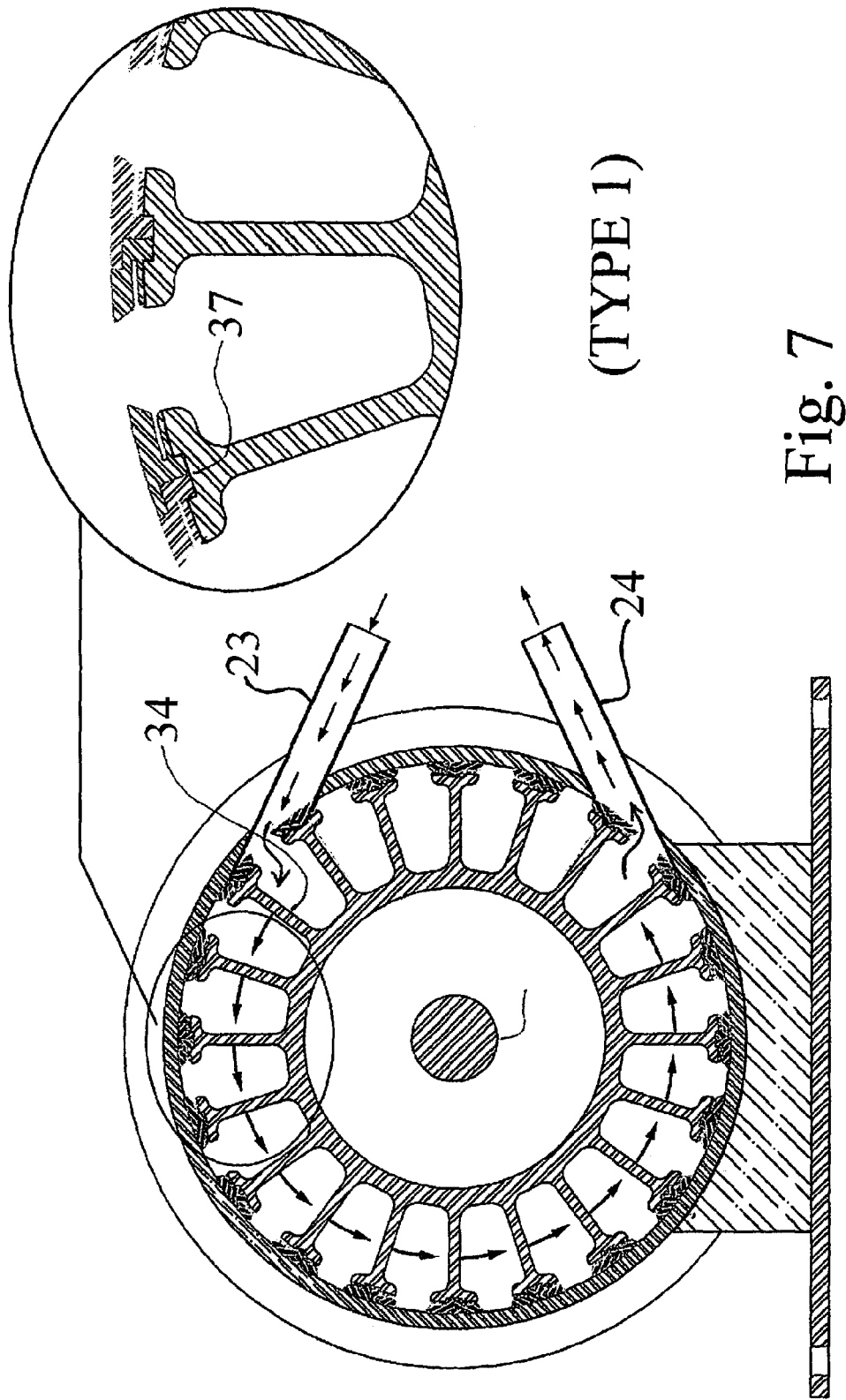
Figure 8:
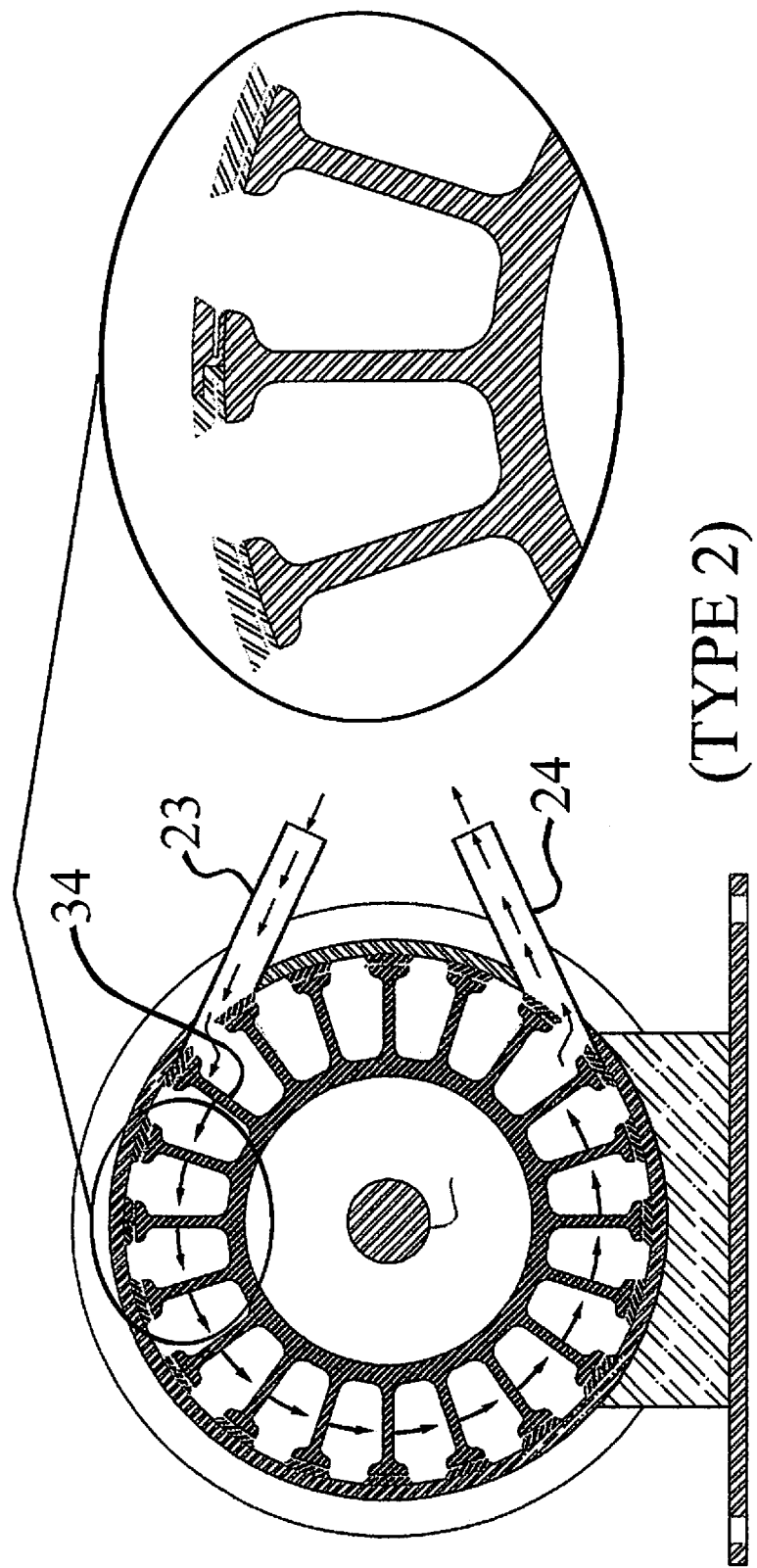

FIGS. 4-11 show various components of the expander. The expander (4) consists of an outer cylindrical casing (17), ends (18), gasket ring (19) having U-shaped cross-section, piston wheel (20), band shaped sealing ring (21, 21') shaft (22) etc. The expander includes at least one working fluid inlet (23) and outlet (24) on the casing (17), connection tubes (25) and support (26). Working fluid inlet (23) and outlet (24) that connect to the casing (17) at a tangent and the cross-section areas of a base (27) of the inlet (23) and the outlet (24) are equal to the thrust surface (34) area. Having such a larger cross-section area at the base (27) allows the working fluid to enter and exit more effectively as well as "enhances a starting thrust". As shown in FIGS. 4 and 6, each end (18) of the expander (4) has a bearing (28) and bolt holes (29) and the convex base structure (30) on the ends (18). The convex base structure (30) of ends (18) can be seen more clearly in FIG. 6. During assembly, the convex base structure (30) is to be embedded into the ends of the casing (17) for "stable placement and sealed to ensure highly accurate concentricity". During assembly, a gap between the each end of the casing (17) and the each ends (18) is sealed by a gasket ring (19) having a U shaped cross section. The structure of the gasket ring (19) can be seen clearly in FIGS. 11(*a*) and (*b*).

The piston wheel (FIG. 5) will now be described in detail. The outer circumference of the piston wheel (20) has three circles of piston chambers (31), as seen in FIGS. 5 & 6. However, such circles can be designed according to the criteria of machine body compactness and sufficient working displacement. Connection tubes (25) connect the three circles of piston chambers (31) in series to "obtain sufficient working displacement for the high pressure expander's isometric working process". The piston chamber's (31) outer-circumference has sealing ring grooves (33) as seen in FIGS. 5 & 6 for at least one band shaped sealing ring (21, 21'), as shown in FIGS. 9 & 10.

To ensure overall structural strength, each single piston chamber's (12) volume (V) should be as small as possible. That is to say, the quantity of piston chambers can be as many as possible and, as the quantity increases, the volume of each chamber proportionally decreases). The thrust, surface's (34) area needs to be as large as possible and the length (L) of the side needs to be as long as possible.

This is due to: H (enthalpy)=U+PV, W (Work)=FS, F (Force)=PA. To ensure that the enthalpy (H) of the high pressure gas can be completely converted into work within sufficient working displacement (S), (given that H=W, U+PV=FS, U (internal energy) and P (pressure) are the high pressure working fluid's primary state parameters (H1, P1)), once maximum working pressure has been determined, it cannot be adjusted, but V (volume), F (force), A (area) and other parameters can be selected accordingly when designing the model of the invention. Through minimising V, increasing L (length)→A (area)→F (force) to achieve the shortest possible sufficient working displacement (S) so that the machine body is compact and practical.

Figure 9:
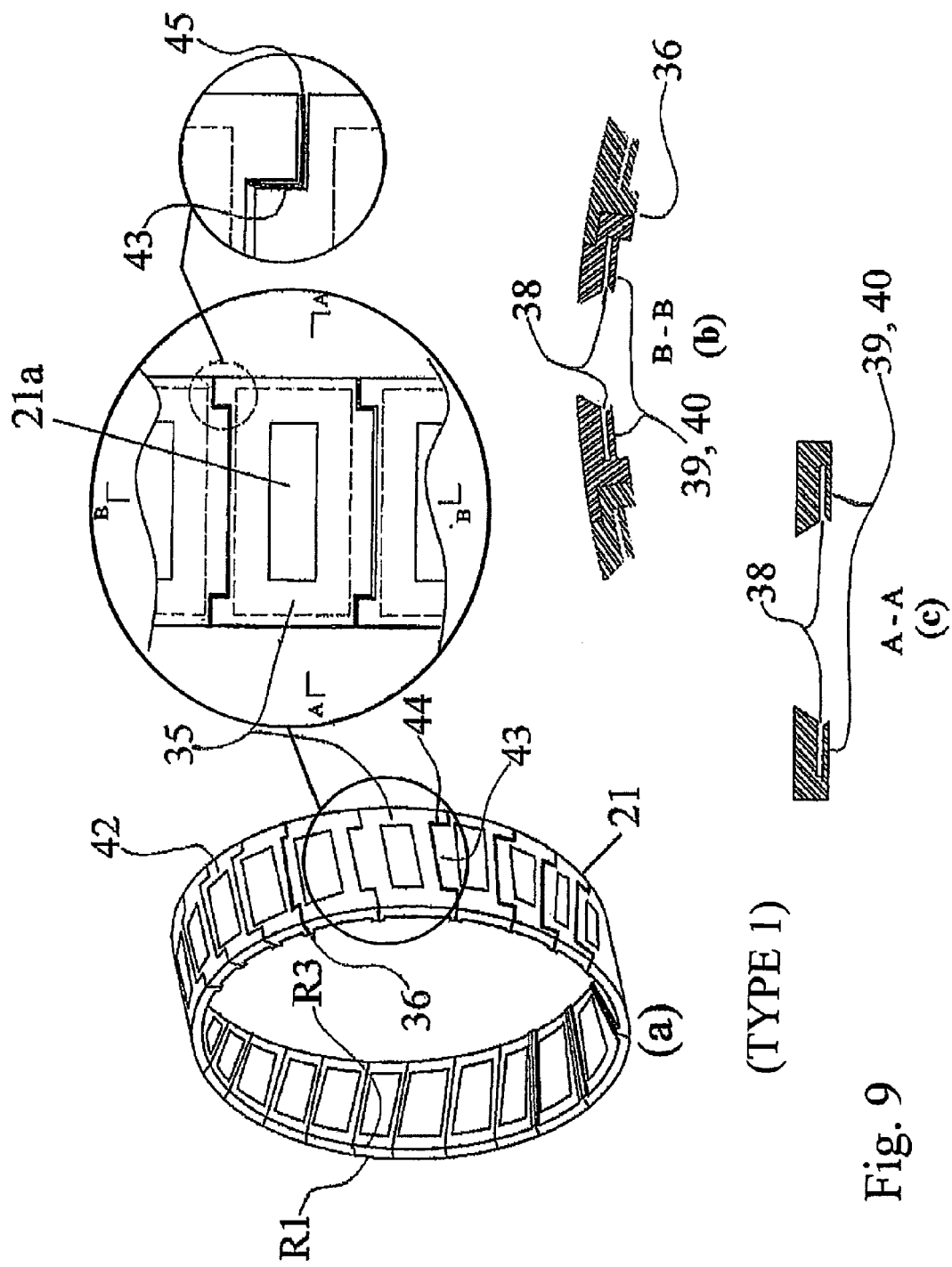
Figure 10:
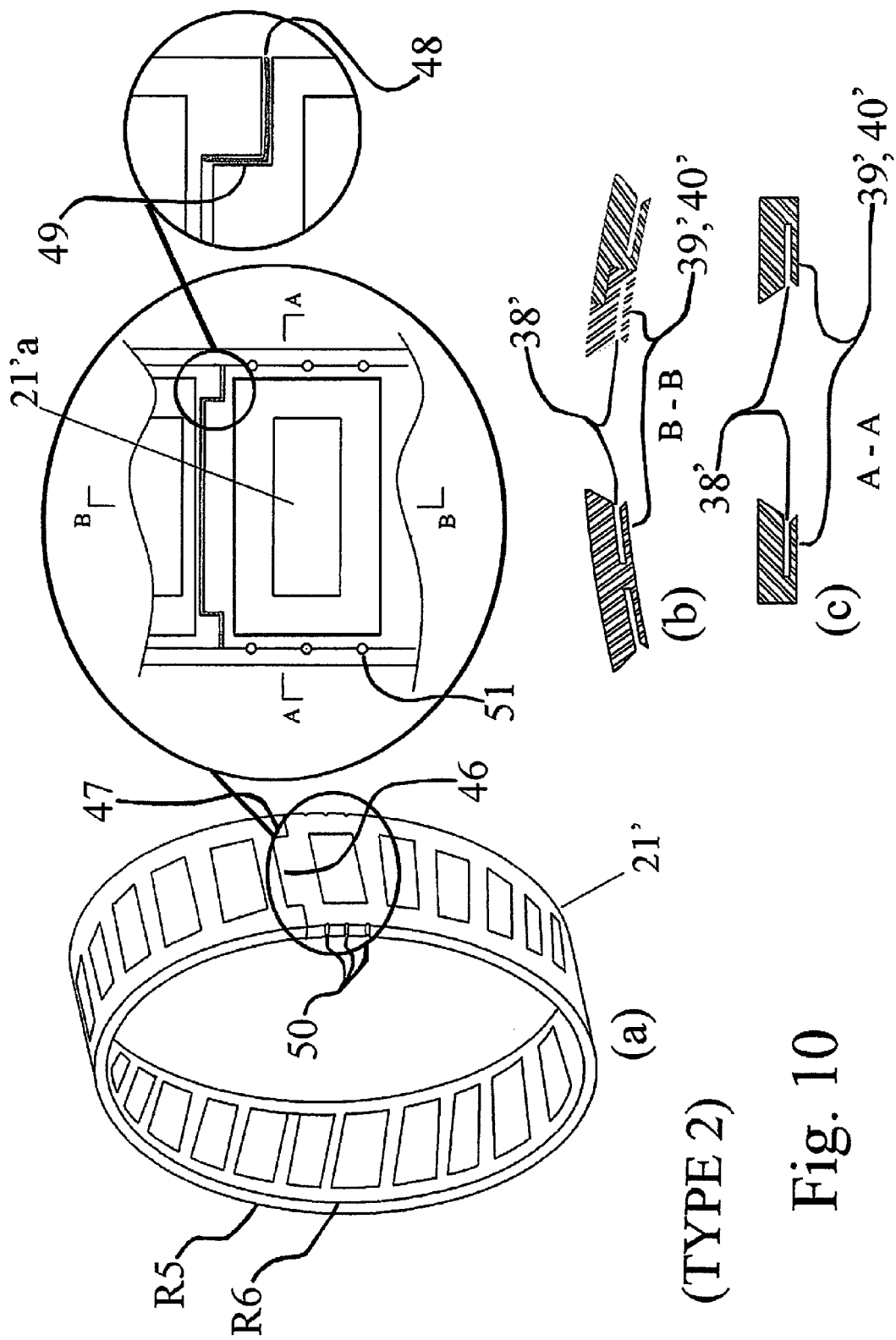

FIGS. 9(*a*)-(*c*) show a first example of a band shaped sealing ring (type 1, 21) of the first type that is formed by a number of substantially square, shaped seal links (35), each having square shaped slots or apertures. The seal links (35) are connected in a jigsaw-like way. The outer circumference of the piston chamber (31) has sealing ring grooves (33) as shown in FIGS. 5 & 6. The links (35) should be fitted one by one into the groove (33) to form a circle. Each circle of the piston chamber (31) is matched with the circle of the band shaped sealing ring (21) formed by a number of shaped links (35). The outer diameter (R1) of the band shaped sealing ring (21) shown in FIG. 9 is substantially the same as the inner diameter (R2) of the casing (17), as shown in FIG. 6. The exterior of the band shaped sealing ring (21) tightly abuts the interior of the easing (17) as shown in FIG. 6. Similarly, the inner diameter (R3) of the band shaped sealing ring (21) shown in FIG. 9 and the diameter (R4) of the circumference surface of the piston chamber's (31) sealing ring groove (33) shown in FIG. 6 are substantially the same.

The two ends of the seal links (35) have a stabilising tenon (36) that is adapted to be fitted into the mortise (37) (see FIG. 5) thereby ensuring that the seal links (35) in the band shaped sealing ring (21) do not dislocate during operation. The inside of the seal links (35) has a perimeter self sealing gap (38) as seen in FIG. 9.

As seen in FIG. 9, the inside wall of the self sealing gap (38) of the seal links (35) has a slightly protruding spring leaf or thin wall (39, 40). When the seal links are installed through hoop stress, the thin wall (39, 40) of each seal link (35) will lie flat and tightly against the circumferential surface of the piston chamber's (31) sealing ring groove (33).

During operation, the high pressure gas will fill up the piston chamber (32) and the self sealing gap (38) of each of the seal links (35) of the band shaped ring (21). Under the fluid pressure, the top, bottom and outside of the self sealing gap (38) of the seal links (35) will be pushed to lie against each other, thereby achieving excellent flexible self sealing.

The outer circumference (42) of the seal links (35) is a friction surface. If, after the long term running of the apparatus, there is wear on the friction surface (42) of the seal links (35), this will lead to deviations in the high precision measurement of components. In such cases, the circle of seal links (35) or the band shaped sealing ring (21) under the double effects of the elasticity of the self sealing gap's (38) thin wall (39, 40) and working fluid pressure, will radial expand tightly against the inner wall of the cylindrical casing (17) and the circumferential surface of the piston chamber's (31) sealing ring groove (33), thereby creating an excellent elastic/flexible seal and automatically compensating for the wear.

As shown in FIG. 9(*a*), the two ends of the seal links (35) are connected by mortise (44) and tenon (43) to form the band shaped sealing ring and there is a flexible spring (45) located on each of the two sides of the interior of the mortise (44), which after the installation pushes tightly against the tenon (43). This will have excellent self sealing under the fluid pressure and can eliminate any leaks from the gap between the mortise (44) and tenon (43).

FIGS. 10(*a*)-(*c*) show a different type of band shaped sealing ring (type 2, 21'). Unlike the band shaped, sealing ring (type 1, 21) of FIG. 9, this band shaped sealing ring (type 2, 21') of FIG. 10 is a single piece of processed metal. The outer diameter (R5) of the band shaped sealing ring (21') and the inner diameter (R2) of the casing are substantially the same. The exterior of the band shaped sealing ring (21) tightly abuts the interior of the casing (17). The inner diameter (R6) of the band shaped sealing ring (21') shown in FIG. 10 and the diameter (R4) of the circumference surface of the piston chamber's (31) sealing ring groove (33) shown in FIG. 6 are substantially the same. The structure of the band shaped sealing ring (type 2, 21') is similar to the structure of the band shaped sealing ring (type 1, 21) of FIG. 9. Similar to square shaped apertures in the seal links (35) forming square shaped apertures uniformly in the band shaped sealing ring (21) of FIG. 9, there are square shaped apertures that are uniformly formed on the circumferential surface of the band shaped sealing ring (21) as shown in FIG. 10.

As shown in FIG. 10, the band shaped sealing ring (21') is a split ring having two ends connected by joints or connectors. The joints or connectors are in the form of a mortise (47) in one end and a tenon (46) in the other end. Similar to the hand shaped sealing ring (21) of FIG. 9, each of the two sides of the interior of the mortise (47) of the band shaped sealing ring (21') also has a flexible spring (48) fitted which, after the installation, pushes tightly against the tenon (46). This will have create a seal under the fluid pressure and can eliminate any leaks from the gap between the mortise (47) and tenon (46).

As can be seen in FIG. 10, the band shaped sealing ring (type 2, 21') has many half-circle shaped stabilising, keyholes (50) at two sides of one end. The wall surface of the piston chamber's (31) sealing ring groove (33) can also have half-circle keyholes (so that after the installation of band shaped sealing ring (21'), the half circle shaped stabilising keyholes (50) will form a perfect circle (51) with the corresponding half-circle key holes on the wall surface of the groove (33). Once stabilising keys (not shown) are inserted there will be no dislocation, of the band shaped sealing rings (21') when they turn.

The piston, wheel shaft (22) has two ends (53, 54) that extend outwards, with one end (53) being used to drive the high pressure working fluid pump and the other end (54) used to output work. This design of the expander (4) is convenient and compact.

Design of a Vaporiser

Figure 12:
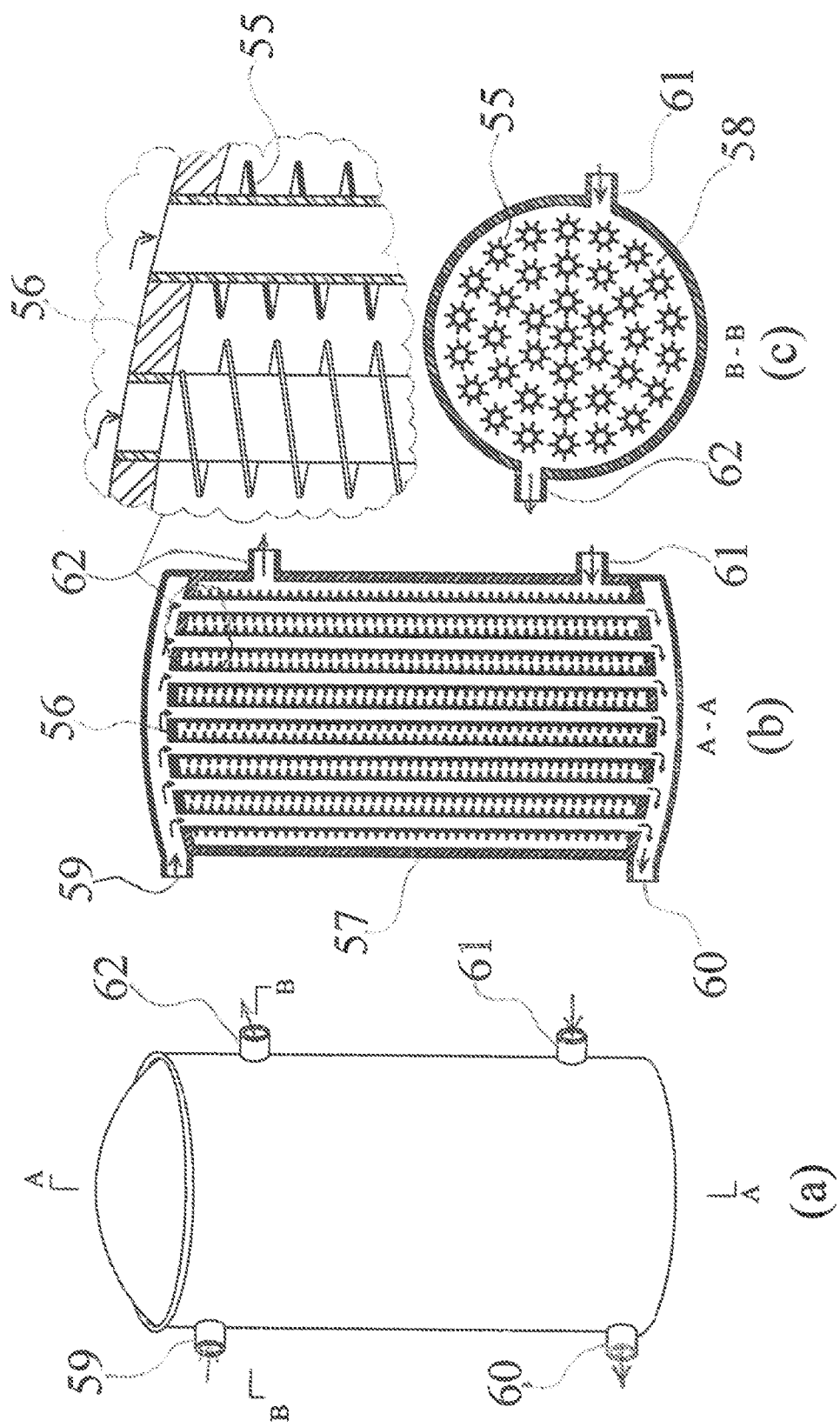

As shown in FIG. 12, the vaporiser (1) uses finned tubes (55) located inside a high pressure shell structure (57). Because, the vaporiser (1) in the context of the present invention is used under cryogenic and high pressure conditions, all the components of the vaporiser (1) should be made out of a material that is able to withstand cryogenic, temperatures and high strength. The examples of such materials are cryogenic steel, stainless steel, high strength aluminum alloy etc. The finned tubes (55) can include high beat conductible material, such as cooper, aluminum alloy, etc., having high pressure ends (56) and a high pressure shell (57) that are assembled in a cluster structure (58) by welding. The ports for entry (59) and exit (60) on the top and bottom of the two sides of the vaporiser (1) are for the second liquid used or to be used in the second cycle described before.

The ports for entry (61) and exit (62) on the top and bottom of the other side of the vaporiser (1) are for the first fluid used or to be used in the first cycle described above. When the high pressure first fluid such as liquid nitrogen (at 62.15K-77.35K, 12 MPa) flows inside shell (57) side, the exterior of finned tubes (55) will need to bear pressure, akin to the working stress bearing arches. This way the finned tubes (55) function well in pressure-bearing with a larger heat-exchange surface area. Low pressure second liquid such as water or antifreeze at <0.1 Mpa flows through the inside of the finned tubes (55). The interior walls of the finned tubes (55) have small heat-exchange surface areas, but because the specific heat of the heat-transfer liquid, such as water, is large, it will flow easily and the amount of heat-exchanged will be large. Thus the gas—liquid heat exchange method constructed in this way is relatively harmonious. As a result, there is excellent heat exchange.

Air Heat Exchanger (9)

Air and the second liquid exchange heat through the air heat exchanger, in which air heat is absorbed by the second liquid. The air temperature drops and the second liquid temperature rises. As the air temperature drops, it produces refrigeration capacity. When the air temperature falls to the dew point, the moisture in air condenses. This produces fresh water. Since moisture in the air has turned into condensation, the air is now dry. This is the dehumidifying function. As the second liquid becomes warm, if is circulated to the vaporiser, where it exchanges heat with the first fluid of the first cycle, thereby transferring heat energy to the first fluid.

As shown in FIG. 2, at various positions in each stage examples of typical phase, temperature and pressure are described and shown:

First Cycle:

I—warm vapour, temperature of 300K and pressure of 12 MPa, density 112.88 kg/m3 and specific enthalpy of 291.94 kj/kg II—cryogenic liquid, temperature of 76K and pressure of 0.1 MPa, density 812.8 kg/m3 and specific enthalpy of −124.86 kj/kg III—cryogenic liquid, temperature of 82K and pressure of 12 MPa, density 810.9 kg/m3 and specific enthalpy of −105.82 kj/kg In between the vaporiser and expander, V can be approximately equal to 1, and in between the working pump and vaporiser, IV can be approximately equal to III Second Cycle:

a—warm liquid, temperature 300K and pressure 0.04 Mpa b—cold liquid, temperature of 250K and pressure of 0.01 MPa c—cold liquid, temperature of 250K and pressure of 0.05 MPa

SCHEDULE OF PARTS

1. Vaporiser
2. Piping
3. Valve
4. Expander
5. Generator
6. Working fluid pump
7. Storage tank
8. Circulation Pump
9. Ambient Heat Exchanger/Heat Exchanger
10. Fan
11. Thermometer
12. Pressure meter
13. Safety Valve
14. Release Valve
15. One way valve
16. Insulation Layer
17. Cylindrical casing
18. Ends
19. U Shaped cross section, of the gasket
20. Piston wheel
21. Baud shaped sealing ring (type 1)
21'. Band shaped sealing ring (type 2)
22. Shaft
23. Working Quid entry port
24. Working fluid exit port
25. Connection tubes
26. Support
27. Base
28. Bearing
29. Bolt hole
30. Convex base structure
31. Three circle of piston chamber
32. Single piston chamber
33. Sealing ring groove
34. Thrust surface
35. Seal link R1: Outer diameter of the band shaped sealing ring (type 1)
R2: Inner diameter of the casing
R3: Inner diameter of the band shaped ring (type 1)
R4: Diameter of the circumference surface of groove
R5: Outer diameter of the band shaped sealing ring (type 2)
R6: Inner diameter of the band shaped sealing ring (type 2)

36. Tenon
37. Mortise
38. Self sealing gap
38'. Self sealing gap
39. Thin wall
39'. Thin wall
43. Tenon
43'. Tenon
44. Mortise
45. Flexible spring
46. Tenon
47. Mortise
48. Flexible Spring
50. Keyhole (half circle)
51. Keyhole (circle)
53. End of piston shaft
54. End of piston shaft
55. Finned tubes
57. High pressure shell structure (of the vaporiser)
58. Cluster Structure (of vaporiser)
59, 61: Ports of entry (on the vaporiser)
60, 62: Ports of exit (on the vaporiser)
I. State parameters of working fluid when at the port of exit on the vaporiser
II. State parameters of working fluid when at the port of exit of the expander
III. State parameters of working fluid when at the port of exit of the working fluid pump
a. Warm liquid between air heat exchanger and vaporiser
b. Cold liquid between vaporiser and circulation pump
c. Cold liquid between circulation pump and air heat exchanger

ADVANTAGES a) Creates a new cryogenic working fluid thermodynamic-refrigeration cycle
b) Creates a new frost-free two stage heat exchange Cycle
c) Uses natural gases as working fluid and water or low freeze point antifreeze as heat transfer liquid
d) Creates a new high pressure expander, which can convert the fluid's pressure energy into mechanical work or torque and into cryogenic liquid.
e) The expander outputs mechanical work that is continuously variable transmission
f) The vaporiser is designed to work in cryogenic and high pressure working conditions
g) Can use air beat energy to output mechanical work, refrigeration capacity and fresh water
h) The refrigeration capacity generated is excellent and can be used in many refrigeration fields.
i) Creates a new heat energy recycling
j) Has dehumidifying function
k) Creates a method of fresh water making from air moisture
l) The invention can be used on land, in the sea and in air during all seasons
m) The invention can also use water heat energy
n) The invention can be used for large industries and closed beat energy recycling
o) The invention can also be used to supply households with power, water, refrigeration and air conditioning.
p) Completely solves energy source and water source shortage and pollution problems.

VARIATIONS

Throughout the description of this specification the words "Apparatus" and "Cold State Engine" are used interchangeably and refer to a "Frost—Free Two Stage Cycle Thermodynamic—Refrigeration System" comprising the "Cryogenic Working Fluid Thermodynamic—Refrigeration Cycle" or "the First Cycle" and "Frost free Heat Exchange Cycle" or "the Second Cycle". Furthermore, the words "cryogenic working fluid" and "first fluid" are used interchangeably, and "heat-transfer liquid" and "second liquid" are used interchangeably.

It is to be understood that various modification may be adopted without departing from the spirit of the invention or scope of the following claims.

The invention claimed is:

1. An apparatus utilizing air thermal to output work, refrigeration and water, comprising:
a first stage cycle device and a second stage cycle device,
the first stage cycle device comprising: a vaporizer; an expander and a pump arranged to pump a cryogenic working fluid in a circuit through the expander and the vaporizer, and
the second stage cycle device comprising: the vaporizer, an ambient heat exchanger, and a circulation pump arranged to pump a heat-transfer liquid in a circuit through the vaporizer and the ambient heat exchanger; wherein the vaporizer is arranged to act as a heat exchanger to transfer heat from the heat-transfer liquid to the cryogenic working fluid, which then absorbs heat to vaporizer into high pressure vapor, the adiabatic expansion occurs in the expander to produce work and cryogenic liquid, and the ambient heat exchanger is arranged to act as a heat exchange unit to transfer heat to the heat-transfer liquid from an external heat source (such as water or the surrounding air), and to output refrigeration capacity, condensate and dry air; and
wherein the expander is installed between the vaporizer and the working fluid pump to convert high pressure vapor into mechanical work and cryogenic liquid, the expander comprises a cylindrical case, piston wheel, band-shaped sealing ring, shaft, beatings base, ends and the cylindrical case has an inlet and an outlet for working fluid and series of connection pipes, the piston wheel has at least one circle of beehive shaped chambers as piston chambers, and the circle of piston chambers are connected in series to obtain sufficient working displacement.

2. The apparatus, as claimed in claim 1, wherein the vaporizer is used to produce high pressure vapour and it is installed between the high pressure working fluid pump and the high pressure expander, a shell side of vaporizer flows high pressure cryogenic working fluid, a tube side flows low pressure heat transfer liquid.

3. The apparatus, as claimed in claim 1, further comprising a plurality of piston chambers of a piston wheel, wherein each piston chamber of the piston wheel has an opening, where there is a groove for a band-shaped self sealing ring installation, wherein the band-shaped self sealing ring has a gap of u-shaped cross-section all around a perimeter the inside of the ring, which has self sealing function.

4. The apparatus, as claimed in claim 1, further comprising at least one high pressure working fluid pump is installed between the expander and vaporizer to increase pressure of cryogenic liquid leaving the expander and thus being pumped back to the vaporizer, and an exterior of the expander, working fluid pump and connecting pipes between them, have at least one insulation layer to reduce heat transfer.

5. The apparatus, as claimed in claim 1, wherein a natural gas (such as N2, He-4, Air, CO2 etc) is used as working fluid of the first stage cycle device, and wherein water or antifreeze with a lower freezing point is utilized as heat-transfer liquid of the second stage cycle device.

6. A method of using an apparatus to convert ambient air or water heat energy to output mechanical work, refrigeration and water in two cycles, the method comprising:

a first cycle and a second cycle;

wherein, in the first cycle, a cryogenic working fluid is heated in a vaporizer to a high pressure vapor state, transferred to an expander where the high pressure vapor is permitted to adiabatically expand, and used to output work and cryogenic liquid, thereby causing a decrease in a temperature and a pressure of the high pressure vapor until it is liquefied, the resultant cryogenic liquid then being pumped back to the vaporizer; and wherein, in the second cycle, a heat-transfer liquid is pumped from the vaporizer to an ambient heat exchanger where the heat transfer liquid receives heat from the ambient air, causing the temperature of the air to decrease and the temperature of the heat-transfer liquid to increase; the heat-transfer liquid being then circulated to the vaporizer to transfer heat to the cryogenic working fluid causing the temperature of cryogenic working fluid to increase and vaporize, thereby causing the temperature of the heat-transfer liquid to decrease; and converting high pressure vapor into mechanical work and cryogenic liquid via the expander, wherein the expander is installed between the vaporizer and the working fluid pump and comprises a cylindrical case, piston wheel, band-shaped sealing ring, shaft, beatings base, ends and the cylindrical case has an inlet and an outlet for working fluid and series of connection pipes, the piston wheel has at least one circle of beehive shaped chambers as piston chambers, and the circle of piston chambers are connected in series to obtain sufficient working displacement.

7. The method, as claimed in claim 6, wherein a cryogenic working fluid thermodynamic-refrigeration cycle of the first cycle comprises three connected thermodynamic processes, an isobaric absorbing heat (vaporize) process by the vaporizer, an adiabatic expansion (do work) process by the expander, and an isentropic compression process (pressure increase) by the working fluid pump.

8. The method, as claimed in claim 6, wherein a technology used is a working fluid gas-liquid phase change cycle, and wherein the first cycle's primary pressure parameter (P1) is set according to the liquefying temperature (T2) of the gaseous working fluid and a large expansion ratio (N2; P1:P2) ≥120).

9. The method, as claimed in claim 6, wherein a working temperature of an air heat exchanger is achieved through adjusting the flow of circulating heat transfer liquid of the second cycle.

10. The method, as claimed in claim 6, wherein a high pressure expander output mechanical work, can be directly used to power a vehicle, a ship, aircraft and various machines, or can be converted into electricity or thermal energy, and because of a dissipation effect, they become waste heat into the atmosphere, which can then be used again, realising a recycling of heat energy.

11. The method, as claimed in claim 6, wherein the high pressure expander output cryogenic liquid, using corresponding heat exchange technology and devices to utilise separate stages of cryogenic refrigerating capacity, and can be made into various refrigeration machines.

12. The method, as claimed in claim 6, wherein the ambient heat exchanger produces condensation, which can be collected and purified as quality fresh water, therefore the apparatus can be made into air water making device, and the fresh water made will be released into the environment after use, then evaporate into the atmosphere, creating a beneficial water cycle.

13. The method, as claimed in claim 6, wherein according to the usage, the apparatus' size is designed according to requirements and is manufactured to be at least one of a portable electricity generator, a large scale power station, and a generator equipped to supply to a household power, refrigeration and air conditioning, and water.

14. The method, as claimed in claim 6, wherein the apparatus uses the heat energy in bodies of water (such as rivers, lakes and oceans) to do work, which is made into a power device to drive ships and submarines.

* * * * *